United States Patent [19]
Kennedy, Jr.

[11] 3,957,228
[45] May 18, 1976

[54] THERMODYNAMIC KITE

[76] Inventor: Guy H. Kennedy, Jr., 1515 Ivy Creek Circle, San Jose, Calif. 95121

[22] Filed: Feb. 10, 1975

[21] Appl. No.: 548,459

[52] U.S. Cl. .................................. 244/33; 244/97; 244/128
[51] Int. Cl.² ...................... B64B 1/44; B64B 1/62
[58] Field of Search ............. 244/30, 31, 33, 96–99, 244/146, 126, 125, 128

[56] References Cited
UNITED STATES PATENTS

| | | | |
|---|---|---|---|
| 1,364,596 | 1/1921 | Wales | 244/146 |
| 1,653,904 | 12/1927 | Hall | 244/97 |
| 1,682,961 | 9/1928 | Hall | 244/97 |
| 1,687,204 | 10/1928 | Hall | 244/97 |
| 1,720,382 | 7/1929 | Slate | 244/61 |
| 2,180,036 | 11/1939 | Dardel | 244/97 |
| 2,740,598 | 4/1956 | Krevelen | 244/30 |
| 2,742,246 | 4/1956 | Mellen | 244/31 |
| 3,079,106 | 2/1963 | Whitnal | 244/30 |
| 3,096,047 | 1/1963 | Dunn | 244/97 |

FOREIGN PATENTS OR APPLICATIONS 1,117,054  6/1968  United Kingdom ................... 244/30

*Primary Examiner*—Trygve M. Blix
*Assistant Examiner*—Galen L. Barefoot
*Attorney, Agent, or Firm*—Richard S. Sciascia; Joseph M. St.Amand; Darrell E. Hollis

[57] ABSTRACT

A thermodynamic kite comprising a non-rigid inflatable body member, a partially rigid helium storage envelope, and a rigid housing. The rigid housing being attached to the underside of the body member contains equipment for maintaining the kite at a preselected altitude as well as safety devices. Attached to the surface of the body member are an interconnected series of inflatable tubes which provide controlled rigidity to the inflatable body member. A radome containing a radar antenna is attached to the body member.

9 Claims, 4 Drawing Figures

THERMODYNAMIC KITE

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

1. Field of the Invention

The present invention relates to an improved radar antenna system, and more particularly to a system and apparatus for extending the range of land-based or shipboard radar systems.

2. Description of the Prior Art

Critical gaps exist in the capabilities of ship radar systems in terms of current offensive tactics and of known developments capable of employment in the not too distant future. It is generally agreed that attacks by low flying aircraft cannot be countered adequately by presently conceived systems and that an intelligent enemy can be expected to take maximum advantage of this weakness. Specifically, the horizon limitation, imposed by standard radar antenna systems, precludes target detection at appreciable ranges and thereby drastically curtails engagement time, thus clearly reducing the number of enemy aircraft that a given ship can engage prior to the release of bombs or missiles by such aircraft.

Several prior art devices have provided means for raising a radar antenna to high altitudes by an unmanned craft so as to effectively extend the horizon and therefore the range of the radar system.

One such craft employs a conventional helicopter blade or propeller system driven through a known type transmission. Such devices are bulky, very expensive and complicated. Also, they require extensive maintenance and are subject to drag limitations. In addition, the high reflective qualities of rotary wings make the craft readily detectable to any enemy search radar.

Another such craft employs a blimp-like structure containing a radar antenna therein. Such craft are not capable of maintaining a specific altitude nor of initiating shape changes to compensate for high winds.

SUMMARY OF THE INVENTION

One embodiment of the present invention comprises a nonrigid inflatable body member having a rigid housing structure attached thereto. The body member contains a partially rigid helium storage envelope which, when heated, expands transmitting buoyancy to the kite. The rigid housing structure contains a gas compressor, the exhaust of which supplies a heated gas to expand the helium storage envelope. The gas compressor also supplies a compressed gas to fill a series of interconnecting tubes located on the inflatable body member. These tubes transmit controllable rigidity to the kite. Various sensors and other equipment for maintaining the kite at a preselected altitude, as well as safety devices are also located in the rigid housing structure. A radome containing a radar antenna is attached to the body member.

Accordingly, one object of the present invention is to provide an over-the-horizon radar antenna system.

Another object of the present invention is to provide a thermodynamic kite.

Still another object of the present invention is to compensate for wind drag.

A still further object of the present invention is to provide controlled rigidity to the kite.

Another object of the present invention is to provide an unmanned device for maintaining a preselected altitude.

Still another object of the present invention is to insure the physical integrity of a thermodynamic kite.

A further object of the present invention is to increase endurance.

Another object of the present invention is to reduce cost and maintenance.

Another object of the present invention is to achieve greater efficiency.

A still further object of the present invention is to provide a thermodynamic kite with lighter than air buoyancy as well as dynamic lift.

Still another object of the present invention is to achieve vertical flight.

Other objects and a more complete appreciation of the present invention and its many attendant advantages will develop as the same becomes better understood by reference to the following detailed description when considered in conjunction with the accompanying drawings in which like reference numerals designate like parts throughout the figures thereof.

DETAILED DESCRIPTION OF THE PREFERRED EMBODIMENT

Figure 1:
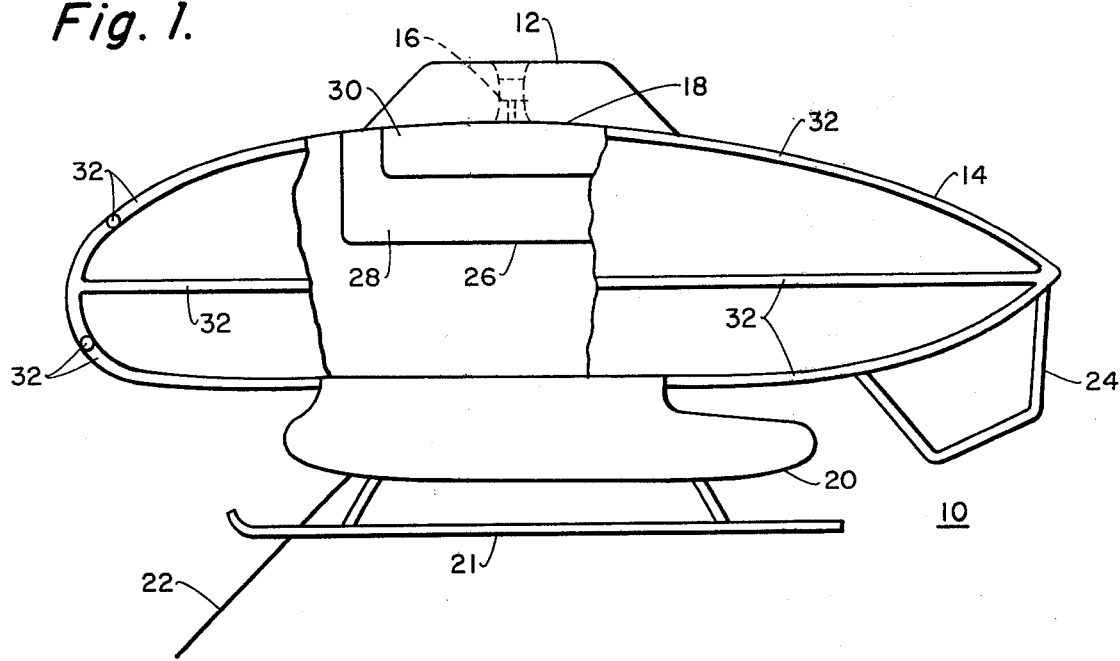
FIG. 1 illustrates a side elevation of one embodiment of the present invention, part of which contains a cutout.

Turning to FIG. 1, a side view of thermodynamic kite 10 is illustrated. Radome 12 is attached to the top of non-rigid, inflatable body member 14. Inside radome 12, radar antennas 16 are positioned on stabilized antenna platform 18 — platform 18 being attached to body member 14. It is noted that primary and secondary antennas 16 are hydraulically driven in scan and automatically stabilized by roll sensors (not shown) controlling hydraulic pressure to positioning actuators. The hydraulic drive mechanism and the roll sensors are not shown nor described in detail as such systems are common in the art. The signals utilized by the antennas 16 are received from and transmitted to a ship (not shown) through an electrical cable disposed within tether line 22. Of course, alternate methods of ship-to-kite communication can be utilized such as the use of radio waves or telemetry.

Rigid housing structure 20 is attached to the underside of body member 14. The contents of rigid housing structure 20 are discussed in more detail, infra, with respect to FIG. 2. Landing skids 21 are attached to the underside of structure 20.

Inflatable aerodynamic stabilizers 24 are attached to the rear underside of body member 14. Stabilizers 24 vertically stabilize kite 10 keeping it directed into the wind.

Expandable helium envelope 26 is located inside body member 14. Helium bag 26 comprises rigid helium storage unit 28 and non-rigid expansion unit 30.

Inflatable tubes 32 are shown attached to the outside skin of body member 14. Tubes 32 are a series of interconnected tubes which, when inflated, transmit rigidity to body member 14.

Figure 2:
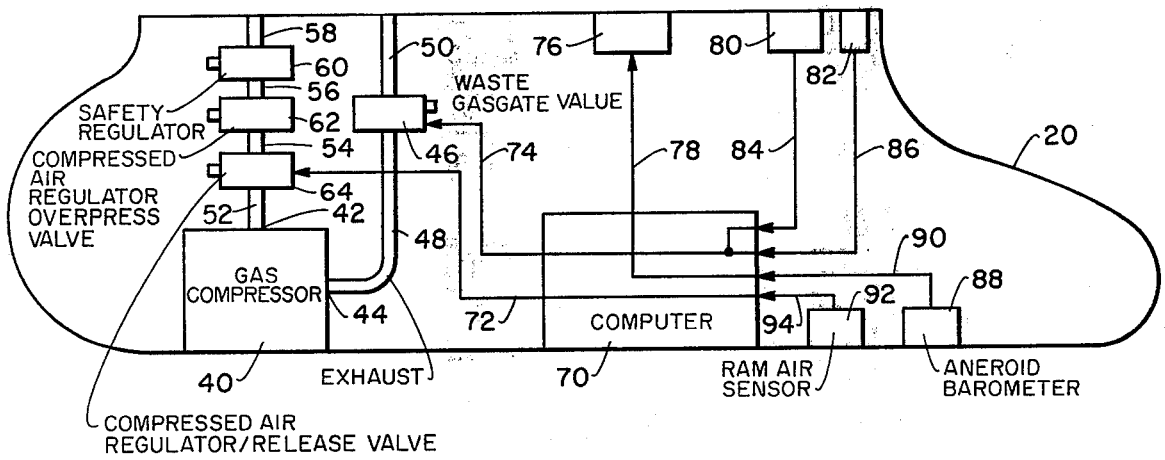
FIG. 2 illustrates the control mechanism for the embodiment of FIG. 1.

Now turning to FIG. 2, gas compressor 40 is shown located within housing 20. Gas compressor 40 has an output 42 and an exhaust 44. Exhaust 44 is connected to waste gas gate valve 46 via exhaust conduit 48. Waste gas gate valve 46 is connected with inflatable body member 14 by gas conduit 50. Valve 46 reduces the volume of exhaust gas entering body member 14 in response to signals from computer 70 via line 74. The gas from exhaust 44 which has been heated by gas compressor 40 enters body member 14, thus heating helium storage unit 28. The heated helium gas in storage unit 28 expands into expansion unit 30 transmitting buoyancy to kite 10. Of course, the heated gas from exhaust 44 also transmits buoyancy to kite 10.

Gas compressor output 42 is transmitted to tubes 32 of FIG. 1 via gas conduits 52, 54, 56 and 58. As tubes 32 are filled with compressed gas they inflate, thereby transmitting rigidity to body member 14.

Compressed air regulator overpressure valve 62 is connected between gas conduit 54 and 56. Valve 62, which is preset, controls the pressure transmitted to tubes 32, thereby controlling the rigidity transmitted to body member 14.

Safety regulator valve 60 is connected between gas conduit 56 and 58. Valve 60 protects body member 14 from catastrophic structural failure in the event regulator overpressure valve 62 should malfunction.

Compressed air regulator release valve 64 is connected between gas conduits 52 and 54. Valve 64 reduces the pressure transmitted to tubes 32 in response to signals received from computer 70 via line 72.

Body member outlet valve 76 controls the volume of gas escaping from body member 14 in response to control signals from computer 70 via line 78. This in turn controls the temperature and pressure of the gas inside body member 14, thus controlling the altitude of kite 10.

Computer 70 provides control signals to valve 64, valve 46, and body member outlet valve 76. Computer 70 is a small general purpose computer capable of performing the basic arithmetic operations as well as executing simple programs.

Body member pressure sensor 80 and body member temperature sensor 82 determine the pressure and temperature of the gas inside body member 14. These measurements are translated into electrical signals and transmitted to computer 70 via lines 84 and 86, respectively.

Aneroid barometer 88 measures the atmospheric pressure and transmits electrical signals to computer 70 via line 90.

Ram air sensor 92 senses the air speed of kite 10, converts this to an electrical signal, and transmits the electrical signal to computer 70 via line 94. Ram air sensor 92 may be a pitot tube.

Aneroid barometer 88 is preset for a specific altitude before kite 10 ascends. Thus, computer 70 receives an indication from barometer 88 as to whether kite 10 is above, below, or directly on the specific preselected altitude.

When kite 10 is below the specific preselected altitude, computer 70 signals valve 76 via line 78, causing valve 76 to reduce the volume of gas escaping therethrough. This in turn increases the pressure and temperature of the gas inside body member 14, thereby causing kite 10 to ascend.

However, should the pressure and/or temperature become too great inside body member 14, computer 70 signals valve 46. This signal causes valve 46 to reduce the volume of exhaust gas entering body member 14, thereby lowering the pressure and/or temperature of the gas inside body member 14. Thus, catastrophic structural failure of body member 14 is eliminated.

Should kite 10 soar above the specific preselected altitude, computer 70 signals valve 76 via line 78 and valve 76 increases the volume of gas escaping therethrough. This in turn reduces the pressure and temperature of the gas inside body member 14, thereby causing kite 10 to descend.

Should kite 10 be on the specific preselected altitude, computer 70 does not signal valve 46 and level flight is maintained.

Should the air speed of kite 10 become so great that catastrophic structural failure may result due to drag from the wind, computer 70 signals valve 64. Valve 64 then reduces the pressure of tubes 32 which reduces the rigidity of kite 10, causing kite 10 to flatten out, thus reducing the drag.

It is noted that computer 70 is provided with information as to maximum air speed, maximum body member 14 pressure and temperature as well as the preselected altitude. Thus, it merely compares the signals received on lines 84, 86, 90 and 94 with its preprogrammed information and outputs the appropriate control signals on lines 72, 74 and 78.

Power for the components located inside housing 20 may be supplied internally or may enter housing 20 from a power cable located inside tether line 22.

Figure 3:
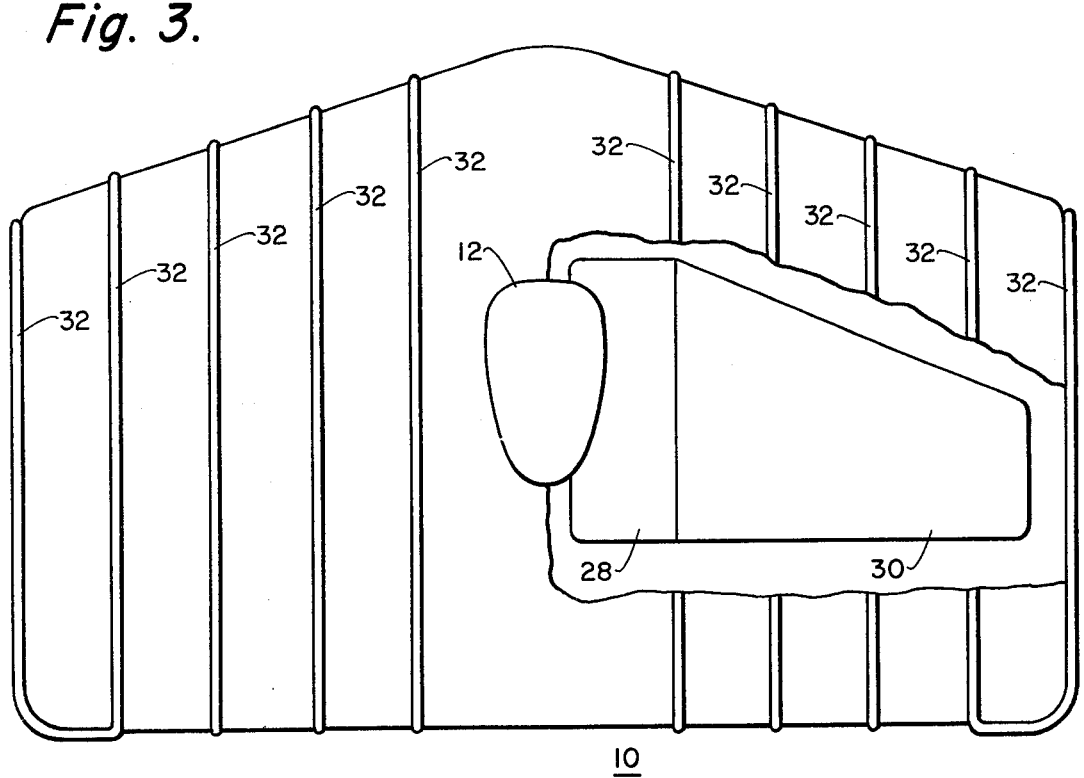
FIG. 3 illustrates a top elevation of the embodiment of FIG. 1 having a cutout portion therein.

FIG. 3 illustrates the shape of kite 10. Kite 10 is shaped substantially similar to an airplane wing so that kite 10 achieves dynamic lift as well as internal lift generated by heated gases described supra. Tubes 32 as explained supra, increase the rigidity of kite 10. They are positioned parallel to the line of flight along the top and underside of kite 10.

Figure 4:
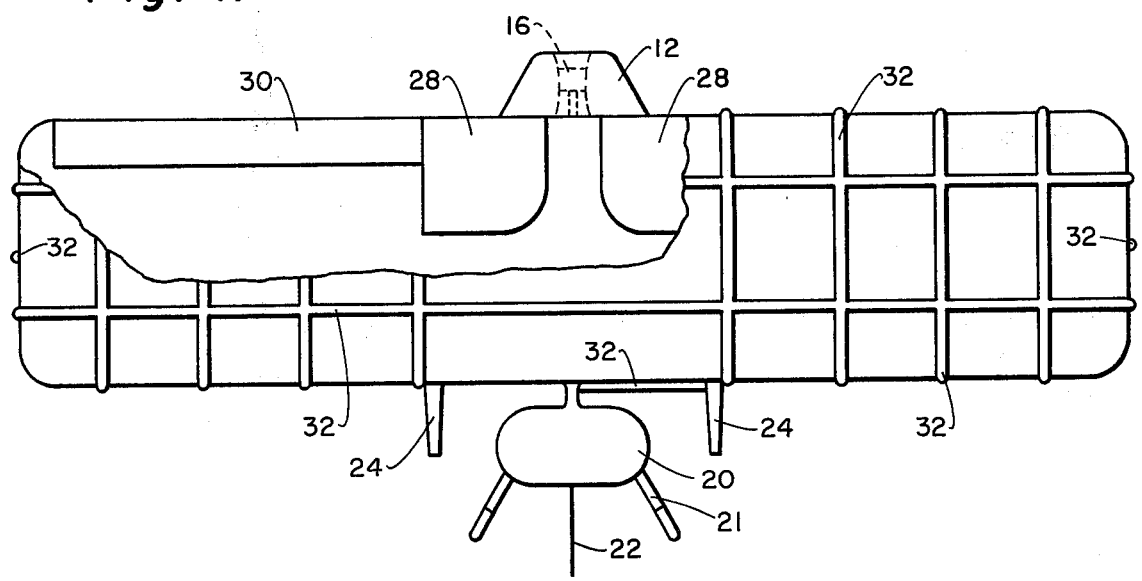
FIG. 4 illustrates a front elevation of the embodiment of FIG. 1 having a cutout portion therein.

FIG. 4 illustrates the frontal portion of kite 10 showing the interconnection of tubes 32 as well as the thinness or wing-like shape of kite 10. Note tubes 32 are parallel to the lines of flight along the sides of kite 10 but perpendicular as well as parallel to the line of flight along the frontal portion of kite 10.

Other uses envisioned for thermodynamic kite 10 include over the horizon UHF-VHF ship-to-ship or ship-to-shore communication, carriage of ship anti-missile defense systems, and anti-submarine warfare coverage.

It is noted that the structural materials of the components of kite 10 are commercially available and, as such, are easily procurable by one having ordinary skill in the art.

Obviously many modifications and variations of the present invention are possible in light of the above teachings. It is therefore to be understood that within the scope of the appended claims the invention may be practiced otherwise than as specifically described herein.

I claim:

1. A tethered thermodynamic kite comprising:

a. a non-rigid, gas-inflatable body member, said member having a front portion;
b. a rigid housing structure attached to said body member, said rigid housing structure having a tether line attached thereto;
c. a partially non-rigid envelope containing a first gas located inside said body member;
d. means for inflating said inflatable body member with a heated second gas causing said first gas to expand, thereby increasing the buoyancy of said kite, said inflating means located within said housing structure but communicating with said body member;
e. means for increasing the rigidity of said body member, said means being attached to said body member;
f. a body member gas outlet valve having a variable orifice;
g. An aneroid barometer located in said housing structure, said aneroid barometer being preset for a specific altitude; and
h. a computer located in said housing structure communicating with said body member gas outlet valve and said aneroid barometer, said computer being programmed to receive signals from said aneroid barometer and actuate said variable orifice of said body member outlet valve, thereby maintaining said kite at a preselected altitude by controlling the amount of gas escaping from said body member.

2. The apparatus of claim 1 wherein said rigidity increasing means comprises a series of interconnecting inflatable tubes attached to said body member and means located in said housing structure for providing a third inflation gas to said tubes.

3. The apparatus of claim 2 wherein said inflatable tubes are disposed parallel to the line of flight of said kite except on said front portion where said tubes are disposed both parallel and perpendicular to the line of flight of said kite.

4. The apparatus of claim 2 wherein said third gas providing means includes a gas compressor connected to said inflatable tubes by a gas conduit, a compressed air regulator overpressure valve for controlling the gas pressure in said inflatable tubes being connected to said gas conduit, thereby determining the rigidity of said kite.

5. The apparatus of claim 4 wherein said third gas providing means includes a safety regulator valve connected to said gas conduit, said safety regulator valve protecting said kite from catastrophic structural failure should said compressed air regulator overpressure valve malfunction.

6. The apparatus of claim 4 wherein said third gas providing means further includes means responsive to the drag on said kite for reducing the gas pressure in said inflatable tubes when the drag reaches unsafe levels, thereby reducing the surface area of said kite striking the wind.

7. The apparatus of claim 6 wherein said gas pressure reducing means comprises:
a. a ram air sensor located in said rigid housing structure;
b. a compressed air regulator release valve connected to said gas conduit, said compressed air regulator release valve reducing pressure in said inflatable tubes;
c. said computer, further communicating with said ram air sensor and said compressed air regulator release valve, said computer being programmed to receive signals from said ram air sensor and actuate said comressed air regulator release valve when said signals from said ram air sensor indicate excessive drag on said kite.

8. The apparatus of claim 1 wherein said inflation means comprises:
a. a gas compressor having an exhaust;
b. a gas conduit connecting said gas compressor exhaust to said body member, said exhaust supplying heated gas to said body member;
c. a waste gas gate valve connected to said gas conduit, said waste gas gate valve diverting exhaust gases from said gas compressor from said member;
d. body member pressure and temperature sensors located in said body member; and
e. said computer, further communicating with said body member pressure and temperature sensors and said waste gas gate valve, said computer being programmed to receive signals from said body member pressure and temperature sensors and actuate said waste gas gate valve when said signals from said body member pressure and temperature sensors indicate an excessive pressure-temperature relationship.

9. The apparatus of claim 1 wherein said non-rigid, inflatable body member is v-shaped similar to an airplane-wing shaped such that it achieves dynamic lift, thereby producing a variable displacement kite capable of vertical flight.

* * * * *